United States Patent [19]

Steinman

[11] Patent Number: 4,610,103
[45] Date of Patent: Sep. 9, 1986

[54] FISHING LURE

[76] Inventor: Kenneth Steinman, 1901 W. Lafayette Blvd., Detroit, Mich. 48216

[21] Appl. No.: 758,357

[22] Filed: Jul. 24, 1985

[51] Int. Cl.$^4$ .............................................. A01K 85/01
[52] U.S. Cl. .................................... 43/17.6; 43/42.06; 43/42.33; 43/42.5
[58] Field of Search .................... 43/17.6, 17.5, 42.06, 43/42.33, 42.5

[56] References Cited

U.S. PATENT DOCUMENTS

| | | | |
|---|---|---|---|
| 1,546,673 | 7/1925 | Poulsen | 43/42.5 |
| 3,453,768 | 7/1969 | Feaster | 43/42.06 |
| 3,921,328 | 11/1975 | Holcombe | 43/42.06 |
| 4,098,017 | 7/1978 | Hall | 43/42.06 |

FOREIGN PATENT DOCUMENTS

| | | | |
|---|---|---|---|
| 2232268 | 1/1975 | France | 43/17.6 |
| 477709 | 8/1975 | U.S.S.R. | 43/17.6 |

Primary Examiner—Gene P. Crosby
Attorney, Agent, or Firm—Cullen, Sloman, Cantor, Grauer, Scott & Rutherford

[57] ABSTRACT

In a fishing lure having a hollow formed transparent body, an open ended transparent tube is projected through the body with its open ends flush with the body surface and secured thereto. An elongated flexible light capsule containing liquid chemicals is snugly and frictionally nested and removably secured within the tube. The chemicals when mixed by first bending the capsule before insertion rendering the capsule luminescent to illuminate the lure body. A modified spoon type lure has a pair of spaced bracket straps stuck from its body to receive and support a light capsule thereon.

6 Claims, 8 Drawing Figures

FISHING LURE

The present invention relates to a fishing lure and more particularly to a chemically luminescent capsule removably nested and secured within the lure body.

BACKGROUND OF THE INVENTION

Heretofore in plug type fishing lures and fishing spoons, efforts have been made to render the lure luminescent by the application thereto of a luminescent paint and in the use of electric lighting involving a battery and bulb circuit.

There are serious objections to electrically luminating a fishing lure, including in some areas the legality of such usage.

Heretofore there have been plug type fishing lures or the like wherein there has been employed a light capsule containing chemicals which when mixed render the capsule luminescent for the illumination of a lure body.

SUMMARY OF THE INVENTION

An important feature of the present invention is to provide a plug type fishing lure consisting of a molded or formed plastic body which is transparent or translucent and through which is projected and secured within the confines of the body an elongated open ended tube. Within said tube there is removably projected and frictionally retained a flexible light capsule containing liquid chemicals. The chemicals when mixed are adapted to render the capsule luminescent for illuminating the lure body.

Another feature is to provide a lure body which consists of a pair of symmetrical body halves having continuous peripheral edges which are brought together and cemented forming in the lure body a sealed chamber.

Another feature is to provide within the assembled formed hollow body of the lure a pair of opposed circular apertures in the wall thereof through which is projected the open ends of an elongated transparent tube secured and sealed therein, and within its hollow enclosed chamber.

It is an important feature to provide the light capsule in the form of an elongated flexible tubular casing which is transparent or transluscent and which contains a pair of isolated liquid chemicals which upon bending of the capsule to a limited amount causes such mixing of the chemicals as to render the entire capsule luminescent. Such luminescent capsule is then snugly and frictionally inserted within the open ended hollow transparent tube thereby illuminating the lure.

Another feature is to provide a spoon type lure which has concave-convex surfaces, which has a pair of spaced aligned arcuate struck out bracket straps which project from one side of the lure body. The elongated flexible light capsule is removably projected and anchored between the lure body and the bracket straps for illuminating the lure body.

These and other objects and features will be seen from the following specification and claims in conjunction with the appended drawing.

THE DRAWING

It will be understood that the above drawing illustrates merely preferred embodiments of the invention, and that other embodiments are contemplated within the scope of the claims hereafter set forth.

DETAILED DESCRIPTION OF AN EMBODIMENT OF THE INVENTION

Figure 1:
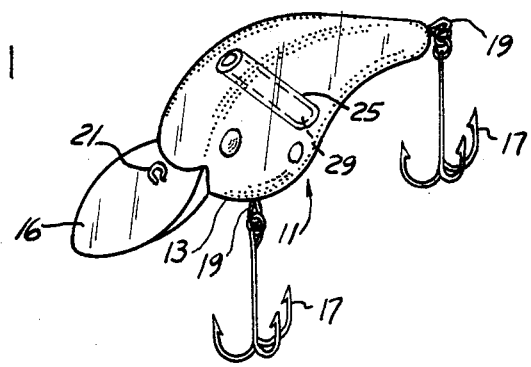
FIG. 1 is a side perspective view of the present luminescent lure.
Figure 2:
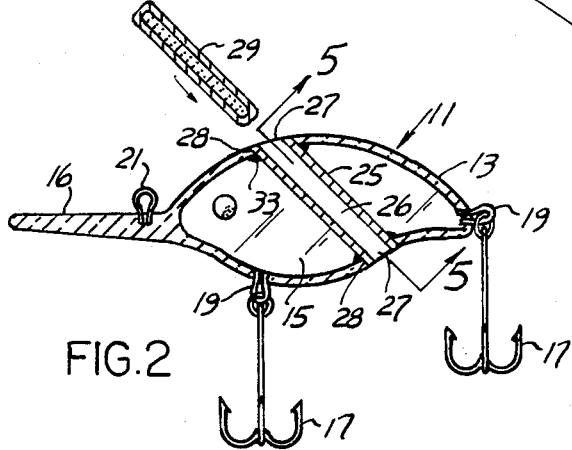
FIG. 2 is a longitudinal section thereof showing the light capsule positioned before insertion.
Figure 3:
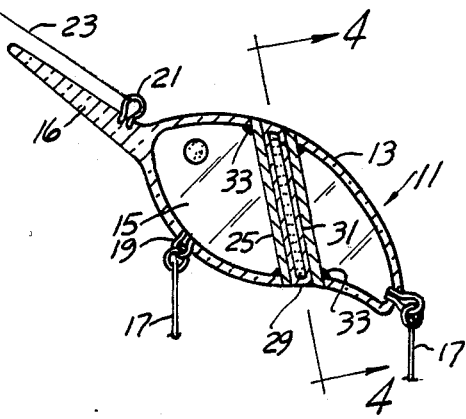
FIG. 3 is a similar longitudinal section with the light capsule inserted into use position within the lure body.

Referring to the drawing a luminescent fishing lure of the plug type is generally indicated at 11, FIGS. 1, 2 and 3 comprising a hollow transparent body 13 molded or formed of a plastic material. The hollow body may be made of a hard plastic such as ABS or LEXAN or of a soft plastic such as polyethylene.

The hollow formed body 13 includes a sealed chamber 15. Molded as a part of the lure body is an elongated generally circular deflector 16 of a conventional shape. A pair of conventional gang hooks 17 are swivelly connected to the eyelets 19 connected to opposite end portions of the lure body. Eyelet 21 is centrally secured to and projects upwardly of delfector 16 and is adapted to receive the conventional fishing line 23 by which the lure is drawn through the water. The present lure may be a floating or a sinking lure depending upon the type of fishing.

An elongated open ended transparent plastic tube 25 is projected through lure body 13, through the sealed chamber 15 therein, has a bore 26 and open ends 27. The respective open ends of tube 25 extend through corresponding opposed circular openings 28 within the top and bottom of the lure body, FIG. 3, and extend to the outer surface thereof. Transparent tube 25 is secured and sealed within and upon and through the lure body as by cement, shown at 33, FIG. 2.

Figures 6, 8:
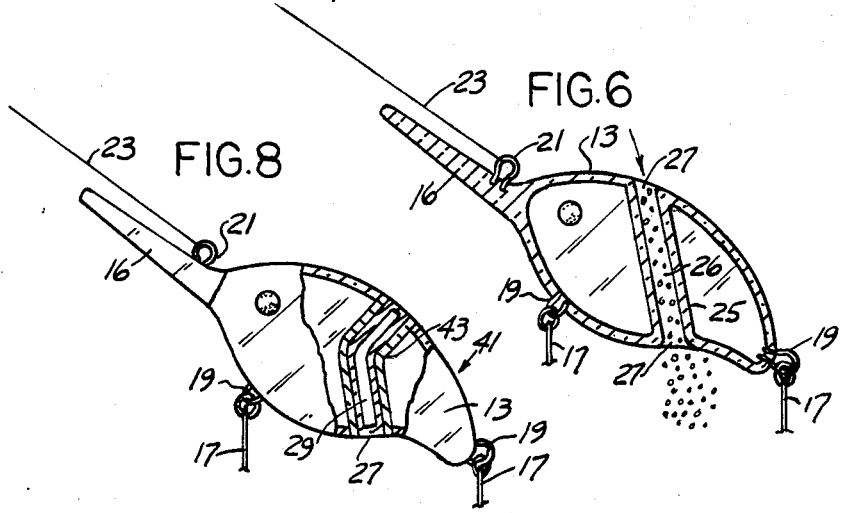
FIG. 6 is a longitudinal section of the hollow lure body with a transverse tube therethrough used without the light capsule to provide a bubble trail.
FIG. 8 is a broken away partly sectioned side view of a modified fishing lure employing an angular tube for the light capsule.

A fishing lure which includes the transparent tube 25 at its ends secured to and through the walls of body 13, is illustrated in FIG. 6. In use on forward movement of the lure through the water, water and air bubbles will pass through bore 26 of said tube. This is one optional use of the present invention without the use of light capsule 29, shown unassembled in FIG. 2 with respect to the lure body and shown assembled in FIGS. 1 and 3.

For the purpose of illuminating the lure body and rendering it more attractive for fishing day or night, there is provided light capsule 29 which is sealed and formed of a flexible plastic material such as polyethylene, for illustration, and which contains at least two isolated liquid chemicals. When the capsule is partly bent about its longitudinal axis such as to the form shown in FIG. 8, whatever partitioning there is between the liquid chemicals is severed so that the chemicals mix and upon agitation or shaking render the complete capsule luminescent.

This light capsule is an article of manufacture on the market manufactured by American Cyanamid Company of Wayne, N.J., 07470. It is referred to as a light stick or a safety light and is covered by the disclosure in U.S. Pat. Nos. 3,576,987 and 3,597,362.

Also an article of manufacture available in the market, the present light capsule, FIG. 2, is aligned with bore 26 of the tube 25 and is manually projected so as to be frictionally and retainingly received within the tube 25 and secured therein.

Before insertion of light capsule 29, FIG. 2, it is required first that the capsule be bent to such sufficient obtuse angle of its respective end portions as will cause an admixing of the liquid chemicals therein so that they fluoresce and render the capsule luminescent.

After such bending rendering the capsule luminescent, the capsule in its straight form, FIG. 2, is manually projected frictionally into and snugly within the tube 25 wherein it is secured and retained but from which is removable when desired. A frictional contact and fit between the light capsule 29 and tube 25 is designated at 31, FIG. 3.

Figure 5:
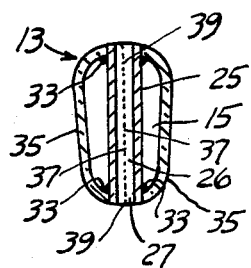
FIG. 5 is a section taken in the direction of arrows 5—5 of FIG. 2.
Figure 4:
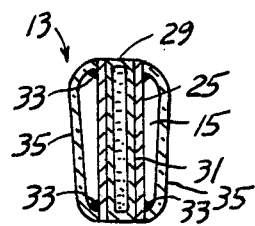
FIG. 4 is a section taken in the direction of arrows 4—4 of FIG. 3.

In the construction of the lure body 13, there is initially molded or formed a pair of symmetrical body halves 35, FIGS. 4 and 5, which have a continuous peripheral inner edge 37 which also includes a longitudinal axis for the lure. The opposed mating edges in registry are cemented or bonded together throughout their contacting edges so as to define the air tight internal chamber 15. The transparent tube 25 is interposed in position such as shown in FIGS. 2, 4 and 5.

Essentially the tube 25 is arranged generally in alignment with the longitudinal axis 37 of the lure body which corresponds to the cooperating peripheral meeting edges 37 of the respective body halves 35, FIGS. 4 and 5.

While cementing is designated at 39 as a means for bonding together the opposed registering symmetrical body halves 35, it is contemplated as equivalent means of securing and bonding the halves together by gluing, ultrasonic welding or dialectic bonding. In all events the respective body halves are peripherally sealed together providing an air tight chamber 15 through which projects the open ended transparent tube 25.

MODIFIED LURE

A modified luminescent lure is designated at 41 in FIG. 8, and wherein the construction of the lure body is the same and instead of the straight elongated transparent tube 25 there is provided a transparent tube 43 wherein end portions thereof are arranged at an obtuse angle or bend. In this construction it is not necessary to first bend the light capsule as was required in FIG. 2. The snug insertion and projection of the light capsule 29 into tube 43 automatically creates such sufficient bending thereof as to fracture whatever partitioning there is between the separated liquids in the capsule so as to render the mixed liquids therein luminescent.

Such luminescence provides illumination for the hollow transparent body 13 of lure 41, FIG. 8.

MODIFIED LURE

Figure 7:
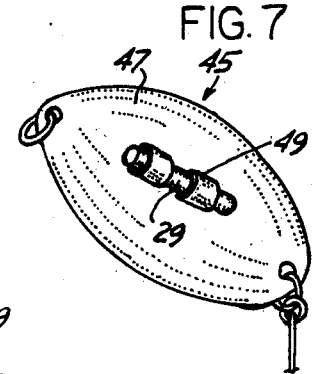
FIG. 7 is a side elevational view of a fishing spoon with a light capsule connected thereto.

A modified luminescent spoon type lure 45 is shown in FIG. 7 as including the concave-convex body 47 wherein the convex surface is shown in FIG. 7. A pair of laterally spaced aligned arcuate bracket straps 49 are struck out from the body 47 from the convex side of the lure, for illustration. It is contemplated that the bracket straps could be struck out from the concave side.

The present light capsule 29, above described in detail, after suitable bending is snugly projected along and engages convex surface portions of the lure body and retainingly engages the spaced bracket straps. The light capsule 29 is frictionally retained in position so that when rendered luminescent will illuminate the lure for use in an otherwise conventional fashion.

In the illustration, FIG. 7, the present light capsule 29 could be stored unbent within the bracket straps 49 and against the corresponding surface of the lure body until ready for use. At that time, the capsule would be manually withdrawn, sufficiently bent for admixing of the chemicals therein and then reinserted within the bracket straps 49 so as to retainingly engage surface portions of lure body 47.

The light capsule 29 once rendered luminescent by the admixing of the chemicals therein, will retain its luminescence for a period of 2 to 4 hours. The light capsule when activated, provides a glow throughout the length of transparent tube 25 within body 15 which is generally transparent. It is contemplated that the body may be of a plastic material which is translucent or to a certain extent opaque, but capable of transmitting some light therethrough.

Having described my invention, reference should now be had to the following claims:

I claim:

1. In a plug type fishing lure, a hollow formed transparent body having a sealed chamber and a central longitudinal axis;
    an elongated open ended transparent tube having a bore projected through said chamber, passing through said axis and at its open ends flush with the outer surface of the body and secured thereto;
    an elongated light capsule containing liquid chemicals, snugly and frictionally nested and removably secured within said tube bore, said chemicals when mixed rendering the capsule luminescent for illuminating the lure body.

2. In the fishing lure of claim 1, said body having a pair of aligned spaced circular openings therein, said tube at its ends being snugly projected into and through said openings.

3. In the fishing lure of claim 1, said body including a pair of opposed symmetrical body halves, each having a continuous peripheral edge, said body halves being assembled edge to edge and bonded together at said peripheral edges.

4. In the fishing lure of claim 1, the securing of the tube to the body being selected from the group consisting of cement, ultrasonic weld and a dialectric bond.

5. In the fishing lure of claim 1, said tube being formed with portions thereof arranged at an obtuse included angle, whereby insertion of the light capsule within the angular tube forms a corresponding obtuse angle in the capsule for effecting mixing of the chemicals therein.

6. In a fishing spoon having a metallic body having concave-convex surfaces;
    a pair of aligned laterally spaced arcuate bracket straps formed in said body adjacent one of its surfaces;
    each strap defining a slit area which is arcuately bent outwardly to form the strap;
    and an elongated flexible light capsule containing liquid chemicals, snugly and frictionally nested and removably secured within and between said bracket straps and body, said chemicals when mixed rendering the capsule luminescent for illuminating the lure body.

* * * * *